United States Patent
Deore et al.

(10) Patent No.: US 8,509,615 B2
(45) Date of Patent: Aug. 13, 2013

(54) OPTICAL AMPLIFIER

(75) Inventors: Abhijeet D. Deore, Sunnyvale, CA (US); Saurabh Kumar, San Mateo, CA (US); Walid El-Taki, San Ramon, CA (US)

(73) Assignee: Infinera Corporation, Sunnyvale, CA (US)

( * ) Notice: Subject to any disclaimer, the term of this patent is extended or adjusted under 35 U.S.C. 154(b) by 362 days.

(21) Appl. No.: 12/814,460

(22) Filed: Jun. 13, 2010

(65) Prior Publication Data

US 2011/0305459 A1  Dec. 15, 2011

(51) Int. Cl.
*H04B 10/08* (2006.01)
*H04B 17/00* (2006.01)

(52) U.S. Cl.
USPC .......................................................... 398/31

(58) Field of Classification Search
USPC ..................................... 398/31, 94
See application file for complete search history.

(56) References Cited

U.S. PATENT DOCUMENTS

2004/0208586 A1* 10/2004 Kinoshita ....................... 398/92
2008/0089693 A1* 4/2008 El-Ahmadi et al. ........... 398/135

OTHER PUBLICATIONS

"Introduction to DWDM Technology" by S. Kartalopoulos, SPIE, 2000, pp. 120-127.*

* cited by examiner

*Primary Examiner* — Shi K Li
(74) *Attorney, Agent, or Firm* — David L. Soltz

(57) ABSTRACT

Consistent with the present disclosure, an optical amplifier is provided that is configurable in one of two modes. In both modes, the optical service channel (OSC) may be dropped and converted to an electrical signal. In the first mode, the electrical signal is subject to further processing and the monitoring and/or control information carried by the OSC may be updated with new data. Such updated monitoring and control information is then supplied to an OSC transmitter and modulated onto an OSC output from the optical amplifier. In a second mode of operation ("loop back" mode), however, the monitoring and/or control information bypasses the processing noted above is looped back to the OSC transmitter unchanged. Accordingly, OSC monitoring and control information or data can be rapidly passed through the optical amplifier with little delay. Moreover, the optical amplifier may be configured to operate in either the first or second modes by appropriately configuring a switch. Thus, a standard optical amplifier can be used as a both a line amplifier, in which OSC data is processed and updated, as well as a booster amplifier in which such updating does not occur, for example, but the OSC data may be propagated to other amplifiers with little delay.

21 Claims, 6 Drawing Sheets

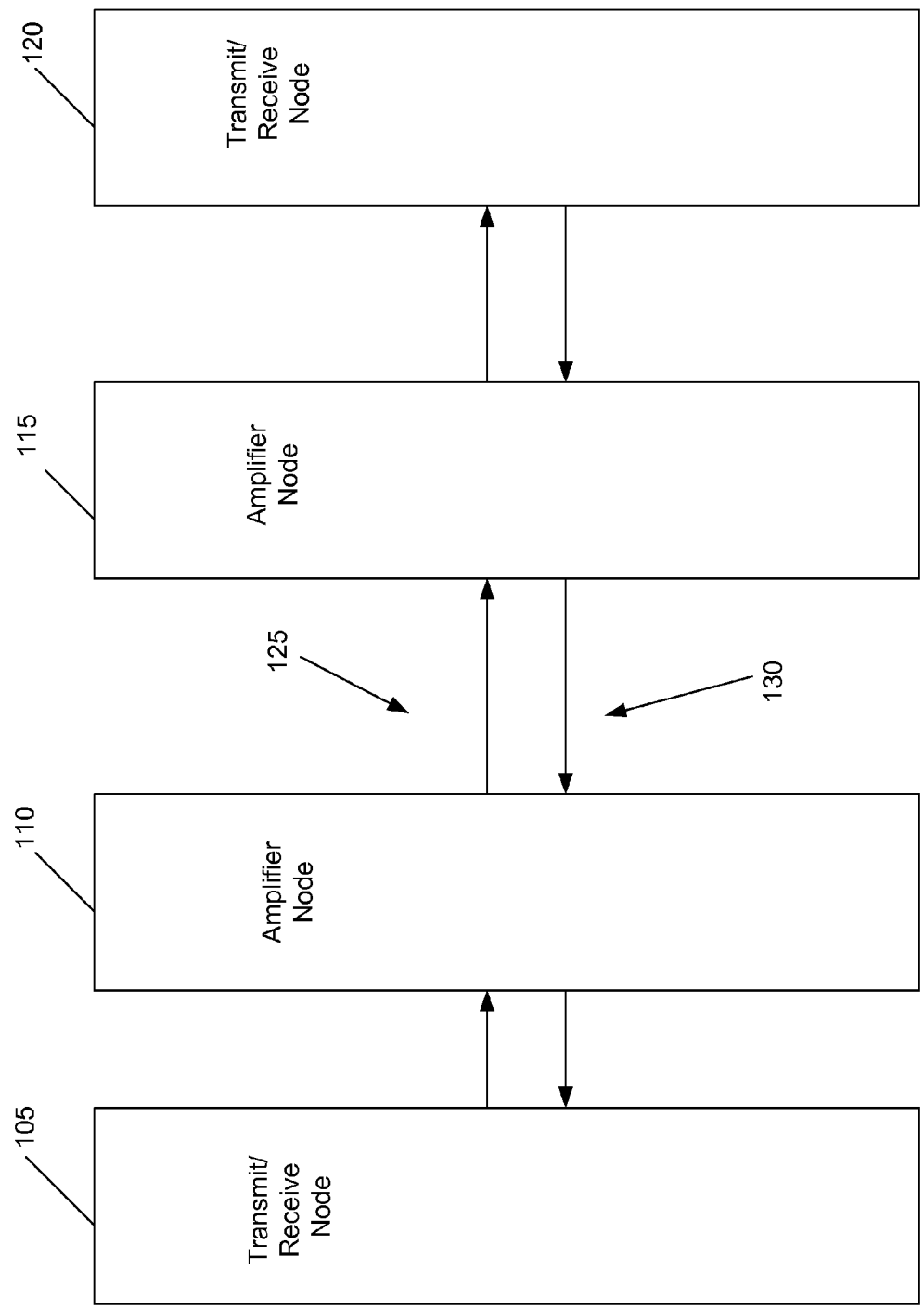

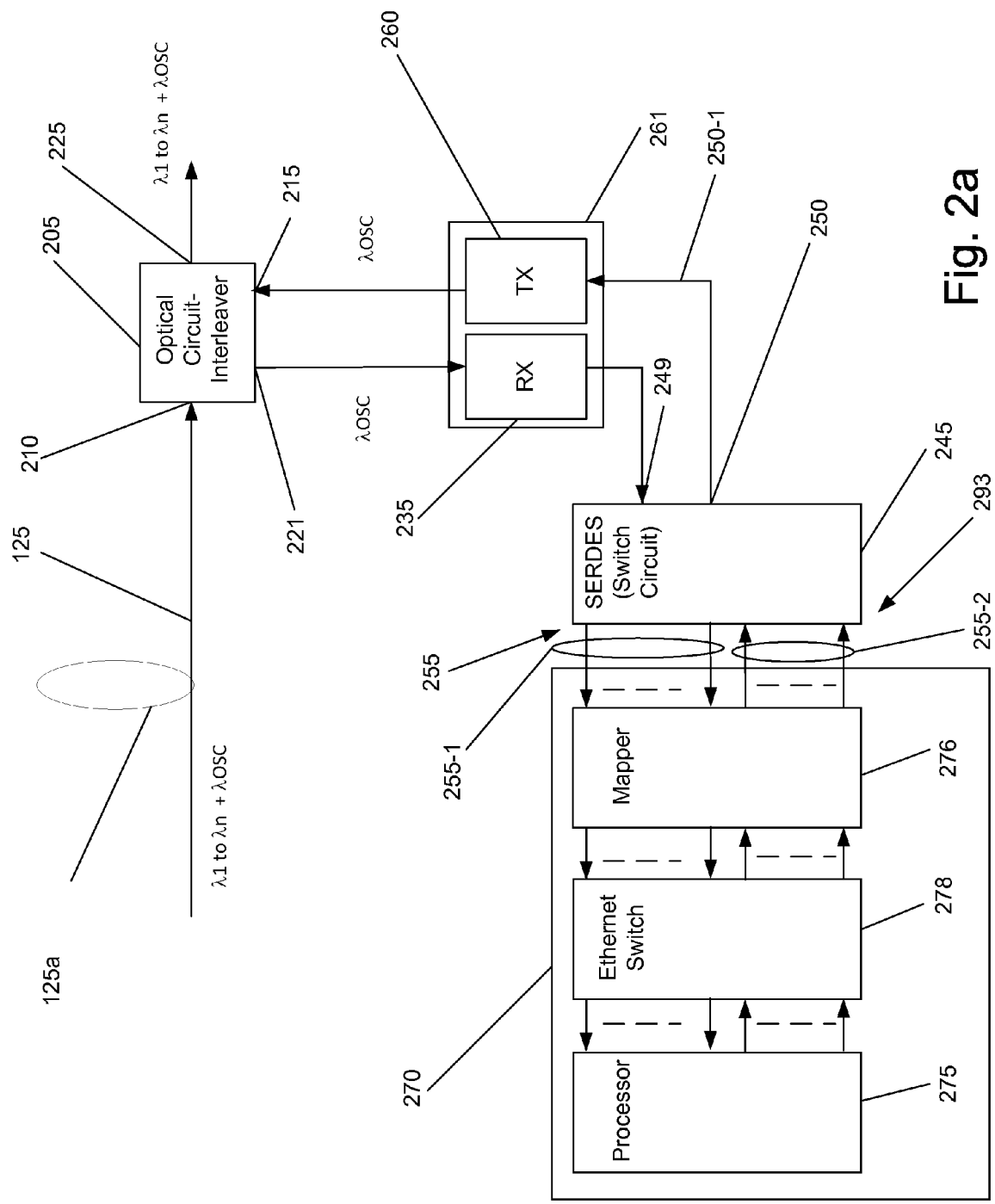

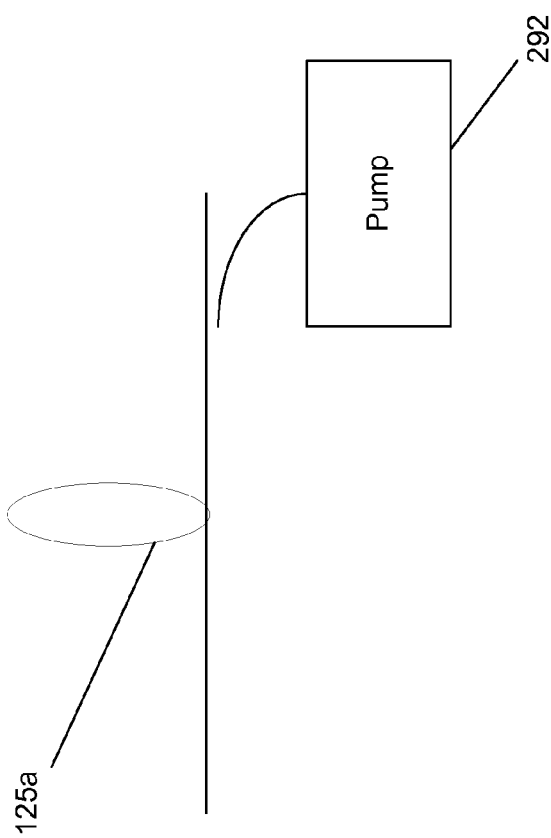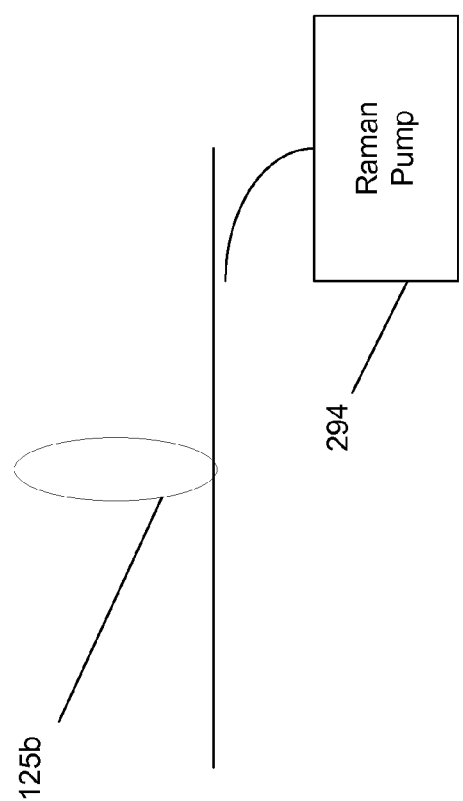

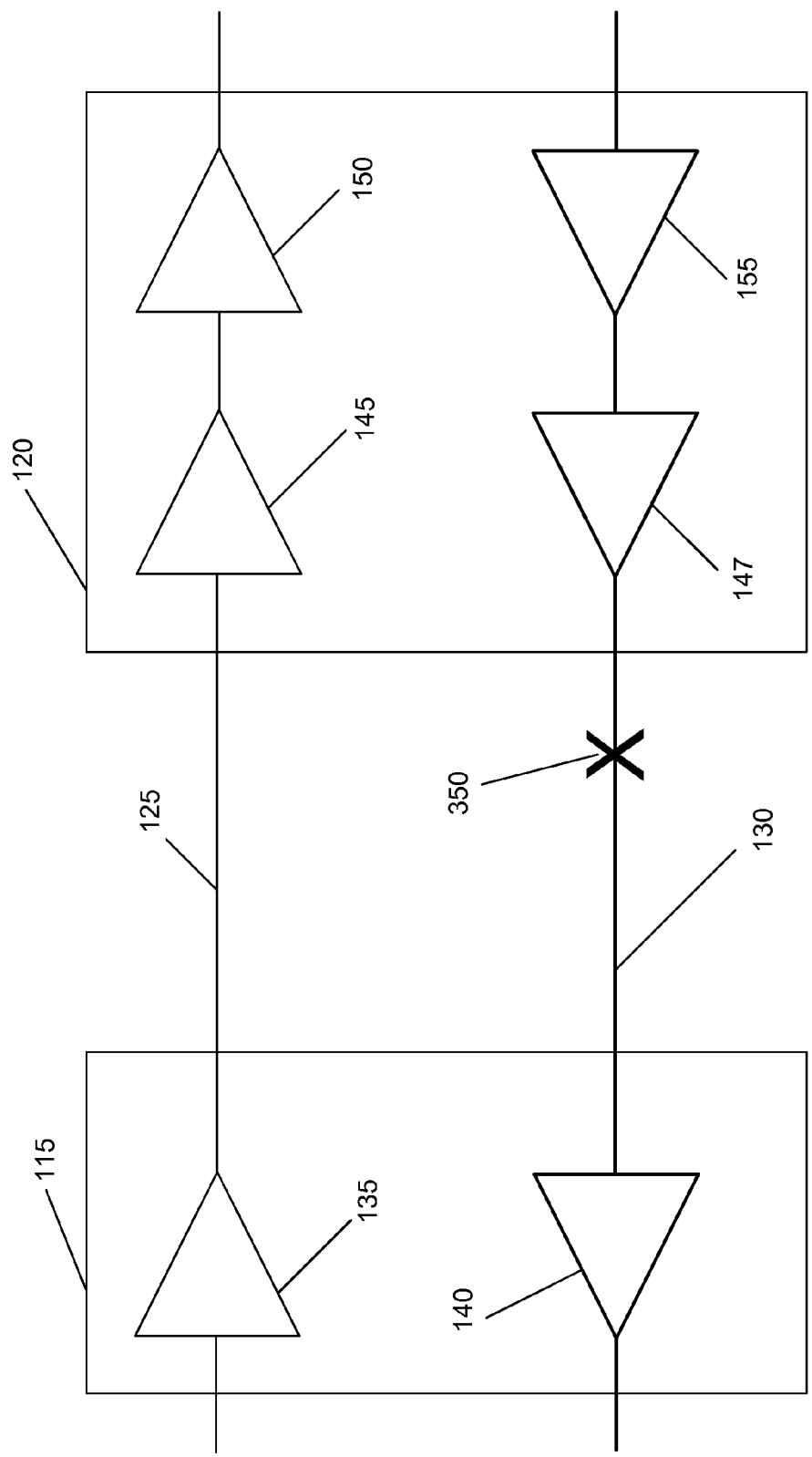

OPTICAL AMPLIFIER

BACKGROUND

An optical network is a system for communicating information over optical fiber using optical transmitters (including, for example, lasers), which transmit data-carrying optical signals over optical fiber links to optical receivers.

In optical networks extending over relatively large distances, the optical signals may be attenuated. Accordingly, optical amplifiers may be provided along the optical fiber link to amplify or boost the power of the transmitted optical signals.

If a break or fault occurs in the optical fiber link, the optical amplifiers provided along the optical fiber link are preferably deactivated or shut-down, so that, for example, a technician may safely repair the break or fault. After the break has been repaired, link recovery processes can be performed and the optical transmitters can then resume transmission of optical signals on the optical fiber link.

Optical amplifiers may be provided at different locations along the optical fiber link. For example, optical amplifiers may be substantially co-located with an optical transmitter to amplify the output of the optical transmitter. The optical transmitter may also include an optical amplifier. Further, optical amplifiers may be substantially co-located with an optical receiver to amplify the optical signals supplied thereto, and the optical receiver itself may have an optical amplifier. For convenience, optical amplifiers provided at the input of an optical receiver may be referred to herein as "preamplifier amps," and optical amplifiers provided at the output of an optical transmitter may be referred to herein as "booster amps."

In order to convey link status or other monitoring and control information in an optical communication system, an optical service channel (OSC) may be provided that carries such information over an optical signal having a wavelength different than the above-noted data-carrying optical signals. The OSC may be transmitted from one network element to the next along the optical fiber link. At each network element, the OSC may be demultiplexed or separated from the other optical signals and converted to a corresponding electrical signal, which is then processed, and retransmitted, often with updated monitoring and control information. As a result, each network element connected along the optical fiber link may receive information about other network elements, such that monitoring information is distributed along the link.

Preferably, control and monitoring information should be distributed as rapidly as possible along the optical fiber link. Booster and preamplifier amps may, like other network elements, process the control and monitoring information, and thus may slow propagation of the OSC. One solution to increase the speed of propagation of the OSC would be to provide booster and preamplifier amps in which the OSC passes through such optical amplifiers without optical-to-electrical conversion. Such booster and preamplifier amps, however, would have a construction different than that of other amplifiers coupled to the fiber optic link. As such, the same optical amplifiers may not be used for booster and non-booster applications (e.g., at locations spaced from transmitter and receivers, such as a line amplifier, as well as in the transmitters and receivers themselves). There is a need, therefore, for a standard optical amplifier that may be used as a both a booster amp and a line amplifier. Further, there is a need that for such an optical amplifier that can rapidly pass an OSC when provided as an booster or preamplifier amp.

SUMMARY

Consistent with an aspect of the present disclosure, an apparatus may include a segment of optical fiber; an optical circuit having a first and second inputs, and first and second outputs, the segment of optical fiber being configured to supply an optical signal carrying client data and a first optical service channel carrying service channel data, the optical circuit being configured to receive the optical signal and the first optical service channel at the first input, and supply the first optical service channel at the second output; a receiver circuit configured to receive the optical service channel from the first output and generate an electrical signal in response thereto, the electrical signal carrying the service channel data; a switch circuit having first and second switch outputs, the switch circuit being configured to selectively supply the optical service channel data to one of the first and second switch outputs; and a transmitter circuit coupled to the first switch output, such that the transmitter circuit receives the optical service channel data when the switch circuit supplies the optical service channel data to the first switch output, the transmitter circuit generating a second optical service channel carrying the optical service channel data, the second input of the optical circuit being configured to receive the second optical service channel, the second optical service channel and the optical signal being supplied at the second output of the optical circuit.

According to another aspect of the present disclosure, an apparatus may include a first segment of optical fiber carrying a first optical signal in a first direction and a first optical service channel; a second segment of optical fiber carrying a second optical signal in a second direction; an optical circuit having a first and second inputs, and first and second outputs, the optical circuit being configured to receive the first optical signal and the first optical service channel at the first input, and supply the first optical service channel at the second output; a receiver circuit configured to receive the optical service channel from the first output and generate an electrical signal in response thereto, the electrical signal carrying the service channel data; a switch circuit having first and second switch outputs, the switch circuit being configured to selectively supply the optical service channel data to one of the first and second switch outputs; a transmitter circuit coupled to the first switch output, such that the transmitter circuit receives the optical service channel data when the switch circuit supplies the optical service channel data to the first switch output, the transmitter circuit generating a second optical service channel carrying the optical service channel data, the second input of the optical circuit being configured to receive the second optical service channel, the second optical service channel and the optical signal being supplied at the second output of the optical circuit; and an optical amplifier coupled to the second segment of optical fiber, the optical amplifier being configured to supply the second optical signal to the second segment of optical fiber; and a control circuit configured to control the optical amplifier in response to the second optical service channel.

According to another aspect of the present disclosure, an apparatus may include a segment of optical fiber; an optical circuit having a first and second inputs, and first and second outputs, the segment of optical fiber being configured to supply a plurality of optical signals, each of which having a corresponding one of a plurality of wavelengths, and each of which carrying respective client data, the segment of optical fiber also carrying a first optical service channel, the optical service channel carrying service channel data, the optical circuit being configured to receive the plurality of optical signals and the first optical service channel at the first input, and supply the first optical service channel at the second output; a receiver circuit configured to receive the optical service channel from the first output and generate an electrical signal in response thereto, the electrical signal carrying the service channel data; a switch circuit having first and second switch outputs, the switch circuit being configured to selectively supply the optical service channel data to one of the first and second switch outputs; and a transmitter circuit coupled to the first switch output, such that the transmitter circuit receives the optical service channel data when the switch circuit supplies the optical service channel data to the first switch output, the transmitter circuit generating a second optical service channel carrying the optical service channel data, the second input of the optical circuit being configured to receive the second optical service channel, the second optical service channel and the plurality of optical signals being supplied at the second output of the optical circuit.

It is to be understood that both the foregoing general description and the following detailed description are exemplary and explanatory only and are not restrictive of the invention, as claimed.

The accompanying drawings, which are incorporated in and constitute a part of this specification, illustrate one several embodiments and together with the description, serve to explain the principles of the disclosure.

BRIEF DESCRIPTION OF THE DRAWINGS

FIG. 1a illustrates a diagram of a system or apparatus that can implement an aspect of the present disclosure.

FIG. 2a illustrates a diagram of an apparatus according to an aspect of the present disclosure.

FIG. 2b illustrates a diagram of a portion of an erbium doped fiber amplifier consistent with an aspect of the present disclosure.

FIG. 2c illustrates a diagram of a Raman amplifier consistent with an additional aspect of the present disclosure.

FIG. 3b illustrates a diagram of amplifier nodes according to an aspect of the present disclosure.

DESCRIPTION OF THE EMBODIMENTS

Figure 1B:
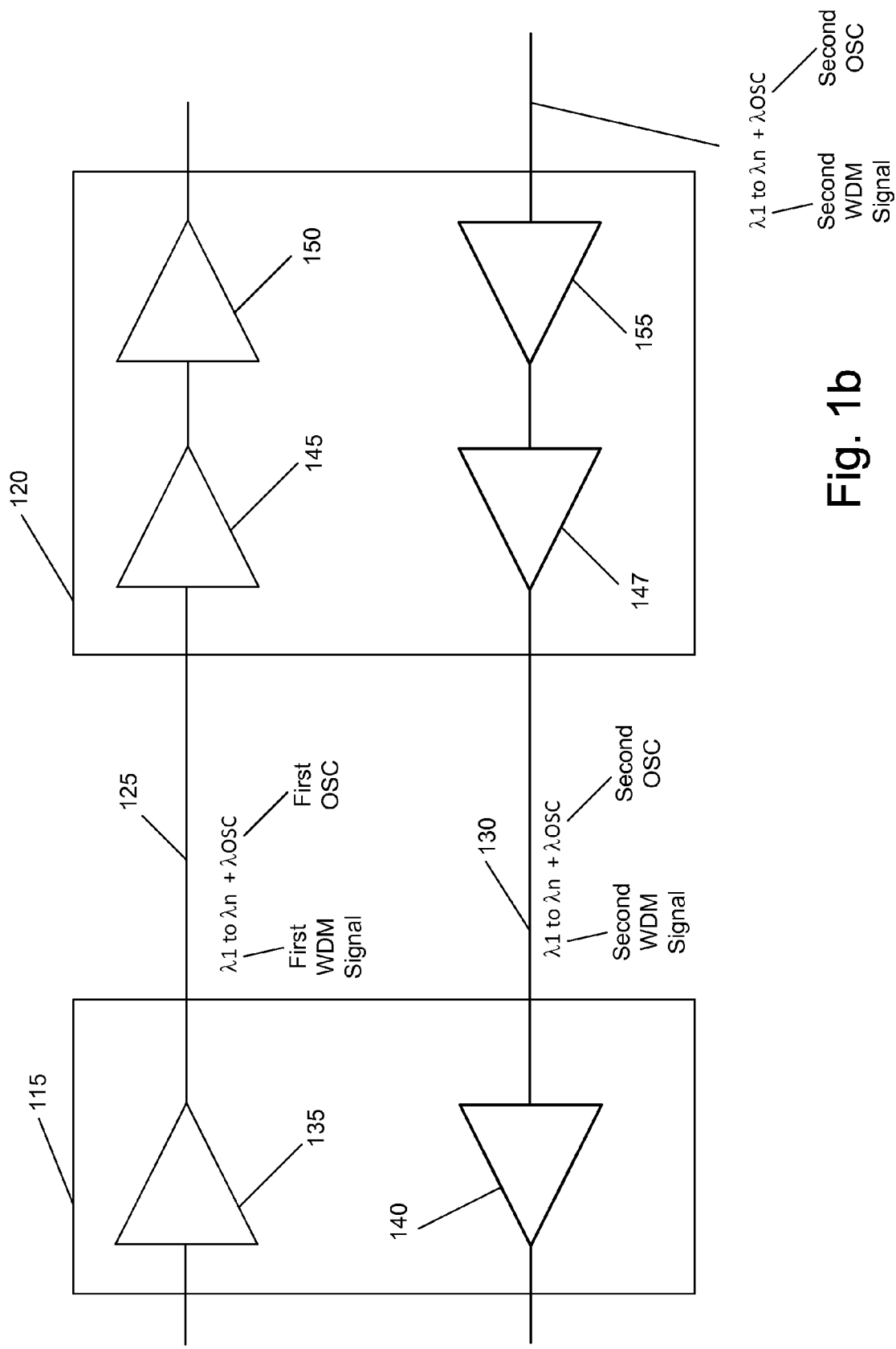
FIG. 1b illustrates a diagram of amplifier nodes according to an aspect of the present disclosure.

Consistent with the present disclosure, an optical amplifier is provided that is configurable in one of two modes. In both modes, the optical service channel (OSC) may be dropped and converted to an electrical signal. In the first mode, the electrical signal is subject to further processing and the monitoring and/or control information carried by the OSC may be updated with new data. Such updated monitoring and control information is then supplied to an OSC transmitter and modulated onto an OSC output from the optical amplifier. In a second mode of operation ("loop back" mode), however, the monitoring and/or control information bypasses the processing noted above looped back or directed to the OSC transmitter unchanged. Accordingly, OSC monitoring and control information or data can be rapidly passed through the optical amplifier with little delay. Moreover, the optical amplifier may be configured to operate in either the first or second modes by appropriately configuring a switch. Thus, a standard optical amplifier can be used as a both a line amplifier, in which OSC data is processed and updated, as well as a booster amplifier or preamplifier in which such updating does not occur, but the OSC data may be propagated to other amplifiers with little delay.

Reference will now be made in detail to the present exemplary embodiments of the present disclosure, examples of which are illustrated in the accompanying drawings. Wherever possible, the same reference numbers will be used throughout the drawings to refer to the same or like parts.

FIG. 1a is a diagram of an exemplary system (apparatus) 100 in which systems and/or methods described herein may be implemented. While FIG. 1a shows a particular number and arrangement of components, the system 100 may include additional, fewer, different, or differently arranged components than those illustrated in FIG. 1a. The system 100 may include components such as, for example, a transmit/receive node 105, amplifier node 110, amplifier node 115, and receive/transmit node 120. The components in the system 100 may be connected by, for example, a west-to-east optical fiber link (or first link) 125 and an east-to-west optical fiber link (or second link) 130. The west-to-east link 125 and the east-to-west 130 link may include optical fibers. Note that the terms "east" and "west" are used for ease of reference to indicate exemplary directions of propagation. In another implementation, a uni-directional link may be instead used. It is understood that the term "node" as used herein, may refer to a collection of components that may be located at an end of an optical fiber link or along an optical fiber link.

FIG. 1b illustrates amplifier node 115 and receive/transmit node (RX/TX) 120 in greater detail. For convenience, additional modules or circuitry in each node are not shown. Instead, the present disclosure will next be described with reference to the optical amplifiers in each node and the connections thereto.

As shown in FIG. 1b, a first wavelength division multiplexed (WDM) optical signal may be amplified by optical amplifier 135 (e.g., a line amplifier) and transmitted on optical fiber link portion 125 to preamplifier amplifier 145. Optical amplifier 135 may include an erbium doped fiber amplifier (EDFA), and the first WDM optical signal may include a plurality of optical signals, each of which having a corresponding one of a plurality of wavelengths ($\lambda 1$ to $\lambda n$) in a known C-band (1525 nm-1565 nm), for example. The first WDM optical signal is amplified by preamplifier amplifier 145, which may also include an EDFA, and passed to amplifier 150, which, in turn, further amplifies the first WDM signal for further propagation to the right in FIG. 1b.

As further shown in FIG. 1b, a second WDM signal, also including optial signals having wavelengths ($\lambda 1$ to $\lambda n$), for example, may be supplied to amplifier 155, where it is amplified and output to booster 147. Both amplifiers 147 and 155 may includes EDFAs. The second WDM signal propagates along optical fiber link portion 130 in a direction opposite to the first WDM signal and is further amplified by amplifier 140. Amplifier 140, in turn, outputs the second WDM signal for further propagation to the left in FIG. 1b.

A first OSC may be transmitted by amplifier 135 to amplifier 145, which receives and retransmits the first OSC $\lambda$OSC to amplifier 150. Amplifier 150, in turn, also retransmits the first OSC for further propagation to the right in FIG. 1b. Optical amplifier 145 will next be described in greater detail with reference to FIG. 2a. It is understood that remaining optical amplifiers 135, 140, 145, 147, 150, and 155 have the same or similar structure as that of optical amplifier 145.

As shown in FIG. 2a, optical amplifier 145 includes a segment of optical fiber 125a, which may be an erbium doped optical fiber. Optical fiber segment 125a may constitute a portion of optical fiber link 125. Optical fiber segment 125a feeds a WDM signal and an OSC (represented λOSC) to an input port 210 of optical circuit 205. Optical circuit 205 may include an optical component that separates or demultiplexes the OSC. For example, optical circuit 205 may include a known interleaver or other known optical component, including optical couplers or optical filters, for example, that can drop the OSC and add the OSC, while permitting the WDM signal to pass. Operation of optical circuit 205 will next be described in greater detail with reference to FIG. 2a.

Optical circuit 205 is configured to output the OSC from port 221 to receiver 235, which may include a photodiode and other known electronics. Receiver 235 converts the received optical signal into an electrical signal, which carries data that was also carried by the OSC ("OSC data"). Receiver 235 may be provided on a transceiver card 261 and may supply an output to input 249 of switch circuit 245, which may include a known serializer-deserializer (SERDES) circuit. In amplifier 245, which operates in the "loop back" mode discussed above, switch 245 is configured to supply the service channel data, unaltered or unchanged, to output 250. Transmitter 260 receives the service channel data from output 250 and generates another or second OSC, which is supplied to input port 215 of optical circuit 205. The second OSC is then combined with the WDM signal in optical circuit 205 and output, with the WDM signal, on output port 225. Accordingly, service channel data bypasses control circuit 270, which includes mapper circuit 276, Ethernet switch 278, and processor circuit 275.

Thus, since optical amplifier 145 is provided in a "loop back" mode in which switch circuit 245 redirects the OSC data back to transmitter 260 without further processing, the OSC can be retransmitted (as a second OSC) from optical amplifier 145 with little delay. Booster optical amplifier 147 has a similar construction as optical amplifier 145. In addition, the switch circuit in optical amplifier 147 is similarly configured to provide looped back OSC data.

As noted above optical amplifier 150, for example, has the same or similar construction as optical amplifier 145 discussed above. However, in optical amplifier 150, switch circuit 245 supplies the OSC data to output or port 255, which may supply a serial data stream or a plurality of parallel data streams, such as parallel data streams 255-1 (see FIG. 2a). Parallel data streams 255-1 supply the OSC data to control circuit 270, which includes mapper circuit 276, Ethernet switch 278 and processor circuit 275, as discussed in greater detail below. Processor circuit 275 may include a conventional microprocessor, for example.

The OSC data may be transmitted in a series of frames, with each frame including a header and a payload. Mapper circuit 276 (e.g., a SONET over Ethernet mapper) extracts the payload, including the OSC data, and supplies the OSC data to Ethernet switch 278, which, in turn, directs the OSC data to appropriate inputs of processor circuit 275. As shown in FIG. 2a, Ethernet switch 278 supplies parallel streams to processor circuit 275. It is understood, however, that Ethernet switch 278 may supply a serial data stream instead.

Next, processor circuit 275 processes the received OSC data, and may update the OSC data with status information related to optical amplifier 150. Such updated OSC data is supplied to Ethernet switch 278 and directed to an appropriate input of mapper circuit 276 over parallel data streams over a serial data stream. In mapper circuit 276, the updated OSC data is encapsulated into frames, each including an overhead, and passed to switch circuit 245 over, for example, parallel data streams 255-2 or a serial data stream. SERDES or switch circuit 245, in turn, converts parallel data stream 255-2 to output serial stream 250-1. Output serial stream includes updated OSC data and is supplied to transmitter 260, which generates a new OSC. The new OSC is then input to port 215, combined with the WDM signal (e.g., the first WDM signal discussed above), and output with the WDM signal at output port 225. Thus, optical amplifier 150 operates in the other mode of operation in which OSC data may be updated or modified by processor 275.

It is noted that optical amplifiers 145 and 150 are typically co-located and are provided relatively close to one another. Thus, the status information of optical amplifier 150 will often be the same as optical amplifier 145. Accordingly, optical amplifier 145 need not process received OSC data, and thus, in accordance with the loop back mode discussed above, optical amplifier 145 may forward or pass the OSC channel, including the OSC data, with a relatively short delay. Optical amplifier 150, however, processes such data, as noted above, in order to maintain proper operation of system 100. For example, control circuit 270 may supply control signals from processor 275 to regulate or control optical amplifier 150 in accordance with the OSC data. For example, pump power associated with optical amplifier 150 may be adjusted in response to such OSC data.

Thus, switch circuit 245 selectively supplies the OSC data to either output 255 (and onto control circuit 270, as in optical amplifier 150) or back to transmitter 260 (as in amplifier 145), unprocessed or unchanged. As noted above, however, amplifiers 145 and 150 may have the same construction, for example, such that each may have the same number and type of components arranged in the same or similar manner. As such, the same amplifier may be provided for both "loop back" applications, as well as applications in which processing of the OSC data is required. Accordingly, system cost and complexity is reduced because the same amplifiers, instead of different ones, may be used as booster and preamplifiers, as well as line amplifiers, for example.

FIGS. 2b and 2c illustrate examples of gain media which may be deployed in accordance with the present disclosure. In FIG. 2b, erbium doped fiber segment 125a imparts a gain to the WDM signal in response to pump light supplied by pump lasers 292. As generally understood, pump laser 292 may provide light having a wavelength of 980 nm or 1480 nm, for example, in order to adequately pump erbium doped fiber segment 125a. In the example shown in FIG. 2c, optical fiber segment 125b, which may also constitute a portion of optical fiber link 125, may be pumped with light from a Raman pump laser 294, in order to impart a Raman gain to the WDM signal.

Figure 3A:
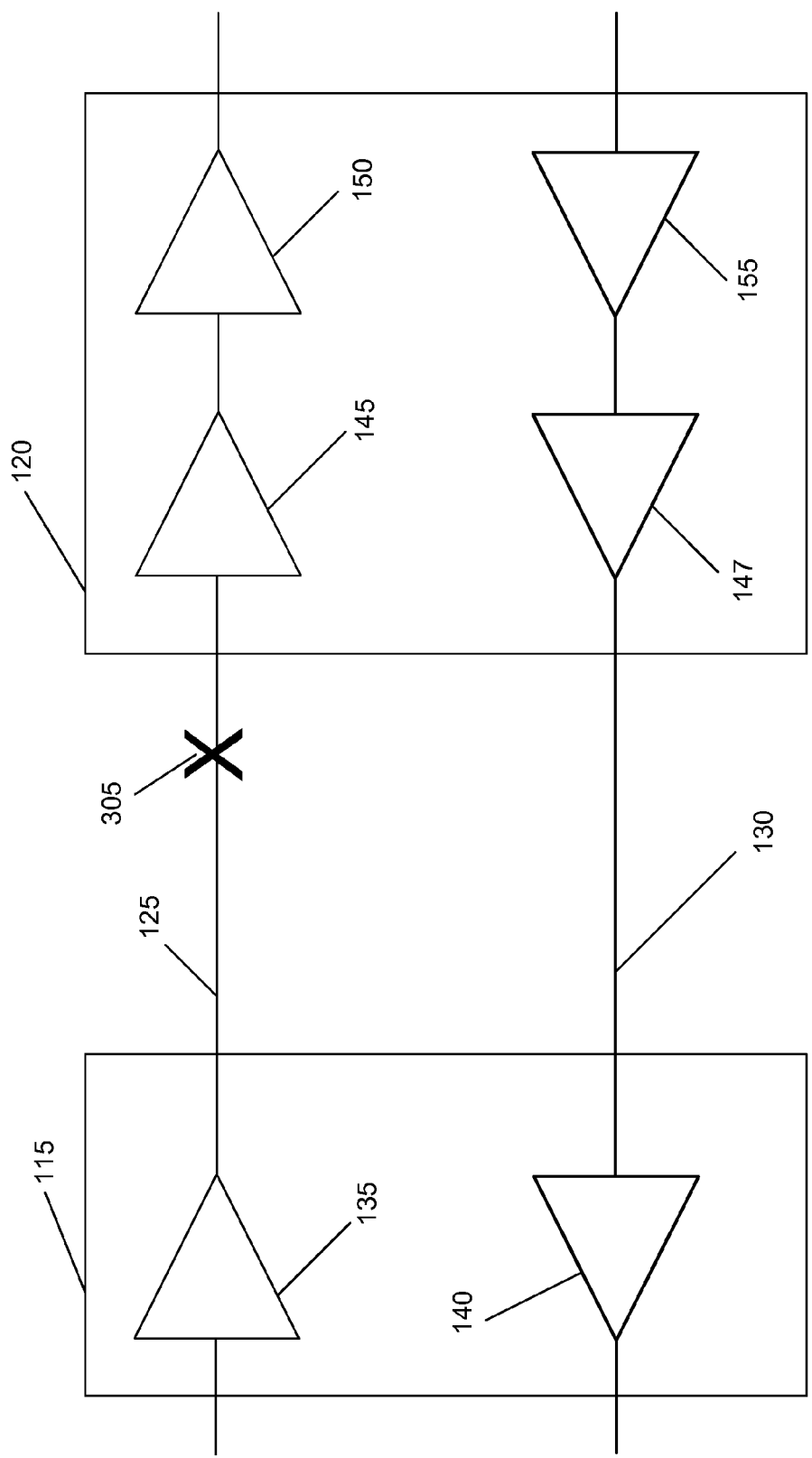
FIG. 3a illustrates a diagram of amplifier nodes according to an aspect of the present disclosure.

Operation of nodes 115 and 120 will next be described with reference to FIGS. 3a and 3b. In FIG. 3a, a fiber break or fault 305 may occur on optical fiber link 125. Preferably, in the example shown in FIG. 3a, optical amplifiers upstream from fault 305, e.g., optical amplifier 135, should be shut down or deactivated so that the fault can be repaired in a safe (e.g., eye-safe) manner. In order to communicate OSC data including a fault indicator used to shut down these optical amplifiers, as well as distribute information concerning the location of fault 305, the fault may first be detected by circuitry in amplifier 145 or 150 that, for example, senses a loss of signal (LOS). Such circuitry may communicate with control circuitry in optical amplifier 155 (similar to control circuit 270 shown in FIG. 2a), so that optical amplifier 155 generates an OSC that carries the fault indicator and location data toward optical amplifier 140. As noted above, booster optical amplifier 147 is configured in a loop back mode, so that such information is rapidly retransmitted by optical amplifier 147 without excessive delay. As a result, control circuitry in optical amplifier 140, similar to control circuitry 270 shown in FIG. 2a, receives the OSC data in a timely manner, and passes such information to control circuitry in optical amplifier 135 to promptly shut this amplifier down.

In FIG. 3b, fault 350 occurs on optical fiber link 130. Here, it may be desirable to shut down optical amplifiers 147 and 155 at node 120 in response to such fault. Thus, in this example, a loss of signal associated with fault 350 will be detected by circuitry in optical amplifier 140. In addition, control circuitry (similar to control circuitry 270 shown in FIG. 2a) provided in optical amplifier 140 supplies a fault indication to control circuitry in amplifier 135. Accordingly, control circuitry (similar to control circuitry 270) n optical amplifier 135, in turn, may shut down this amplifier but also control it to output OSC data including the fault indicator, for example, for transmission on an OSC on optical fiber link portion 125. The OSC is supplied to optical amplifier 145, which, as noted above, is also in a loop back mode to quickly retransmit the OSC to optical amplifier 150. Control circuitry (also similar to control circuitry 270) in optical amplifier 150, in turn, detects the fault indication and passes such information to control circuitry in amplifier 155 or in node 120, which may, in turn, shut down amplifiers 147 and 155 in a timely fashion. Control circuitry in optical amplifiers 147 and 155 may also be similar to control circuitry 270 shown in FIG. 2a. Other embodiments will be apparent to those skilled in the art from consideration of the specification. It is intended that the specification and examples be considered as exemplary only, with a true scope and spirit of the invention being indicated by the following claims.

What is claimed is:

1. An apparatus, comprising:
   a segment of optical fiber;
   an optical circuit having a first and second inputs, and first and second outputs, the segment of optical fiber being configured to supply an optical signal carrying client data and a first optical service channel carrying first service channel data, the optical circuit being configured to receive the optical signal and the first optical service channel at the first input, and supply the first optical service channel at the second output;
   a receiver circuit configured to receive the optical service channel from the first output and generate an electrical signal in response thereto, the electrical signal carrying the first service channel data;
   a switch circuit having first and second switch outputs, the switch circuit being configured to selectively supply the optical service channel data to one of the first and second switch outputs;
   a control circuit coupled to the second switch output, such that the control circuit receives the first optical service channel data when the switch circuit supplies the first optical service channel data to the second switch output, the control circuit being configured to generate second optical service channel data;
   and
   a transmitter circuit coupled to the first switch output, such that the transmitter circuit receives the first optical service channel data when the switch circuit supplies the first optical service channel data to the first switch output by bypassing the control circuit, whereby the transmitter circuit generates a second optical service channel carrying the first optical service channel data, the second input of the optical circuit being configured to receive the second optical service channel, the second optical service channel and the optical signal being supplied at the second output of the optical circuit.

2. An apparatus in accordance with claim 1, wherein the segment of optical fiber imparts a gain to the optical signal.

3. An apparatus in accordance with claim 2, wherein the segment of optical fiber includes erbium.

4. An apparatus in accordance with claim 2, wherein the gain is a Raman gain.

5. An apparatus in accordance with claim 1, wherein the optical circuit includes an interleaver.

6. An apparatus in accordance with claim 1, wherein the optical circuit includes a filter.

7. An apparatus in accordance with claim 1, wherein the optical circuit includes a coupler.

8. An apparatus in accordance with claim 1, wherein the optical signal has a first wavelength, the first optical service channel has a second wavelength, and the second optical service channel has a second wavelength, the first wavelength being different than the second wavelength.

9. An apparatus in accordance with claim 1, further including:
   an optical amplifier configured to receive the second optical service channel, the control circuit being coupled to the optical amplifier and being configured to control the optical amplifier in response to the second optical service channel.

10. An apparatus in accordance with claim 1, wherein the control circuit includes a microprocessor.

11. An apparatus in accordance with claim 1, wherein the switch circuit supplies the second optical service channel data to the transmitter circuit, and the transmitter circuit supplies a third optical service channel carrying the second optical service channel data, the second input of the optical circuit being configured to receive the third optical service channel, and the second output of the optical circuit being configured to supply the third optical service channel.

12. An apparatus in accordance with claim 1, wherein the second switch output provides the first service channel data as a parallel data stream.

13. An apparatus, comprising:
   a first segment of optical fiber carrying a first optical signal in a first direction and a first optical service channel;
   a second segment of optical fiber carrying a second optical signal in a second direction;
   an optical circuit having a first and second inputs, and first and second outputs, the optical circuit being configured to receive the first optical signal and the first optical service channel at the first input, and supply the first optical service channel at the second output;
   a receiver circuit configured to receive the optical service channel from the first output and generate an electrical signal in response thereto, the electrical signal carrying the service channel data;
   a switch circuit having first and second switch outputs, the switch circuit being configured to selectively supply the optical service channel data to one of the first and second switch outputs;
   a control circuit;
   a transmitter circuit coupled to the first switch output, such that the transmitter circuit receives the optical service channel data when the switch circuit supplies the optical service channel data to the first switch output to thereby bypass the control circuit, the transmitter circuit generating a second optical service channel carrying the optical service channel data, the second input of the optical circuit being configured to receive the second optical service channel, the second optical service channel and the optical signal being supplied at the second output of the optical circuit; and an optical amplifier coupled to the second segment of optical fiber, the optical amplifier being configured to supply the second optical signal to the second segment of optical fiber, the control circuit being configured to control the optical amplifier in response to the second optical service channel.

14. An apparatus in accordance with claim 13, wherein the segment of optical fiber imparts a gain to the optical signal.

15. An apparatus in accordance with claim 14, wherein the segment of optical fiber includes erbium.

16. An apparatus in accordance with claim 14, wherein the gain is a Raman gain.

17. An apparatus in accordance with claim 13, wherein the second switch output provides the first service channel data as a parallel data stream.

18. An apparatus, comprising:

a segment of optical fiber;

an optical circuit having a first and second inputs, and first and second outputs, the segment of optical fiber being configured to supply a plurality of optical signals, each of which having a corresponding one of a plurality of wavelengths, and each of which carrying respective client data, the segment of optical fiber also carrying a first optical service channel, the optical service channel carrying first service channel data, the optical circuit being configured to receive the plurality of optical signals and the first optical service channel at the first input, and supply the first optical service channel at the second output;

a receiver circuit configured to receive the optical service channel from the first output and generate an electrical signal in response thereto, the electrical signal carrying the first service channel data;

a switch circuit having first and second switch outputs, the switch circuit being configured to selectively supply the optical service channel data to one of the first and second switch outputs;

a control circuit coupled to the second switch output, such that the control circuit receives the first optical service channel data when the switch circuit supplies the first optical service channel data to the second switch output, the control circuit being configured to generate second optical service channel data;

a transmitter circuit coupled to the first switch output, such that the transmitter circuit receives the optical service channel data when the switch circuit supplies the first optical service channel data to the first switch output whereby the first optical service channel data bypasses the control circuit, the transmitter circuit generating a second optical service channel carrying the first optical service channel data, the second input of the optical circuit being configured to receive the second optical service channel, the second optical service channel and the plurality of optical signals being supplied at the second output of the optical circuit.

19. An apparatus in accordance with claim 18, wherein the segment of optical fiber imparts a gain to the optical signal and includes erbium.

20. An apparatus in accordance with claim 18, wherein the segment of optical fiber imparts a Raman gain to the optical signal.

21. An apparatus in accordance with claim 18, wherein the second switch output provides the first service channel data as a parallel data stream.

* * * * *